United States Patent
Futamura

(10) Patent No.: US 12,130,150 B2
(45) Date of Patent: Oct. 29, 2024

(54) INFORMATION PROCESSING DEVICE, INFORMATION PROCESSING SYSTEM, AND INFORMATION PROCESSING METHOD

(71) Applicant: JVCKENWOOD Corporation, Yokohama (JP)

(72) Inventor: Ryotaro Futamura, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 248 days.

(21) Appl. No.: 17/726,562

(22) Filed: Apr. 22, 2022

(65) Prior Publication Data

US 2022/0244064 A1 Aug. 4, 2022

Related U.S. Application Data

(63) Continuation of application No. PCT/JP2020/029462, filed on Jul. 31, 2020.

(30) Foreign Application Priority Data

Dec. 24, 2019 (JP) .................................. 2019-232444

(51) Int. Cl.
*G06F 17/00* (2019.01)
*G01C 21/36* (2006.01)
(Continued)

(52) U.S. Cl.
CPC ..... *G01C 21/3602* (2013.01); *G01C 21/3647* (2013.01); *G01C 21/3697* (2013.01);
(Continued)

(58) Field of Classification Search
CPC ............ G01C 21/3602; G01C 21/3647; G01C 21/3697; G06Q 10/087; G06Q 30/0205; G06Q 30/0246; G06Q 30/0266
(Continued)

(56) References Cited

U.S. PATENT DOCUMENTS

| | | | |
|---|---|---|---|
| 2004/0036622 A1* | 2/2004 | Dukach | G06Q 30/02 340/988 |
| 2005/0187714 A1* | 8/2005 | Brulle-Drews | G01C 21/3691 702/3 |

(Continued)

FOREIGN PATENT DOCUMENTS

JP 2013-020432 1/2013

OTHER PUBLICATIONS

International Search Report and Written Opinion for International Application No. PCT/JP2020/029462 mailed on Oct. 27, 2020, 8 pages.

*Primary Examiner* — Justin R. Blaufeld
*Assistant Examiner* — Matthew J Ludwig
(74) *Attorney, Agent, or Firm* — Amin, Turocy & Watson, LLP

(57) ABSTRACT

An information processing device includes a video obtaining unit that obtains a video of the outside of a vehicle as taken by a camera installed in the vehicle; a position information obtaining unit that obtains the position information of the vehicle; a person detecting unit that detects persons based on the face images included in the video obtained by the video obtaining unit; an eye gaze direction determining unit that determines the direction of eye gaze of each person detected by the person detecting unit; a degree-of-interest determining unit that, based on the directions of eye gaze as determined by the eye gaze direction determining unit, determines the degrees of vehicle interest with respect to the vehicle; and a route setting unit that associates the position information and the degrees of vehicle interest, and sets a route that should be taken.

12 Claims, 10 Drawing Sheets

(51) Int. Cl.
*G06Q 10/087* (2023.01)
*G06Q 30/0204* (2023.01)
*G06Q 30/0242* (2023.01)
*G06Q 30/0251* (2023.01)

(52) U.S. Cl.
CPC ....... *G06Q 10/087* (2013.01); *G06Q 30/0205* (2013.01); *G06Q 30/0246* (2013.01); *G06Q 30/0266* (2013.01)

(58) Field of Classification Search
USPC ....................................................... 701/523
See application file for complete search history.

(56) References Cited

U.S. PATENT DOCUMENTS

| | | | | |
|---|---|---|---|---|
| 2015/0348112 | A1* | 12/2015 | Ramanujam | G06Q 30/0266 705/14.63 |
| 2016/0363991 | A1* | 12/2016 | Schlecht | G06F 3/167 |
| 2017/0191838 | A1* | 7/2017 | Laur | G06Q 10/047 |
| 2020/0005353 | A1* | 1/2020 | Shibayama | G06Q 30/0242 |
| 2020/0234337 | A1* | 7/2020 | Fujii | G06V 20/56 |
| 2021/0081994 | A1* | 3/2021 | Newell | G06Q 30/0265 |
| 2022/0101381 | A1* | 3/2022 | Terzian | G09F 21/048 |

* cited by examiner

FIG.3

| PERSON | ATTRIBUTE | | | DEGREE OF INTEREST |
| --- | --- | --- | --- | --- |
| | AGE | GENDER | ... | |
| 1 | TEENS | FEMALE | ... | P1 |
| 2 | 20s | MALE | ... | P2 |
| 3 | 30s | MALE | ... | P3 |
| 4 | 40s | FEMALE | ... | P4 |
| ... | ... | ... | ... | ... |

FIG.4

| PERSON | ATTRIBUTE | | | WEIGHT | DEGREE OF INTEREST |
| --- | --- | --- | --- | --- | --- |
| | AGE | GENDER | ... | | |
| 1 | TEENS | FEMALE | ... | W1 | P1×W1 |
| 2 | 20s | MALE | ... | W2 | P2×W2 |
| 3 | 30s | MALE | ... | W3 | P3×W3 |
| 4 | 40s | FEMALE | ... | W4 | P4×W4 |
| ... | ... | ... | ... | ... | ... |

FIG.5

| ADVERTISE-MENT | ATTRIBUTE | | | RATIO |
|---|---|---|---|---|
| | AGE | GENDER | ... | |
| ADVERTISE-MENT C1 | TEENS | MALE | ... | R1 |
| | TEENS | FEMALE | ... | R2 |
| | 20s | MALE | ... | R3 |
| | 20s | FEMALE | ... | R4 |
| | ... | ... | ... | ... |

FIG.6

| ADVERTISE-MENT | LOCATION | ATTRIBUTE | | | DEGREE OF INTEREST |
|---|---|---|---|---|---|
| | | AGE | GENDER | ... | |
| ADVERTISE-MENT C1 | LOCATION A | TEENS | MALE | ... | P11 |
| | | | FEMALE | ... | P12 |
| | | 20s | MALE | ... | P13 |
| | | | FEMALE | ... | P14 |
| | | 30s | MALE | ... | P15 |
| | | | FEMALE | ... | P16 |
| | | ... | ... | ... | ... |

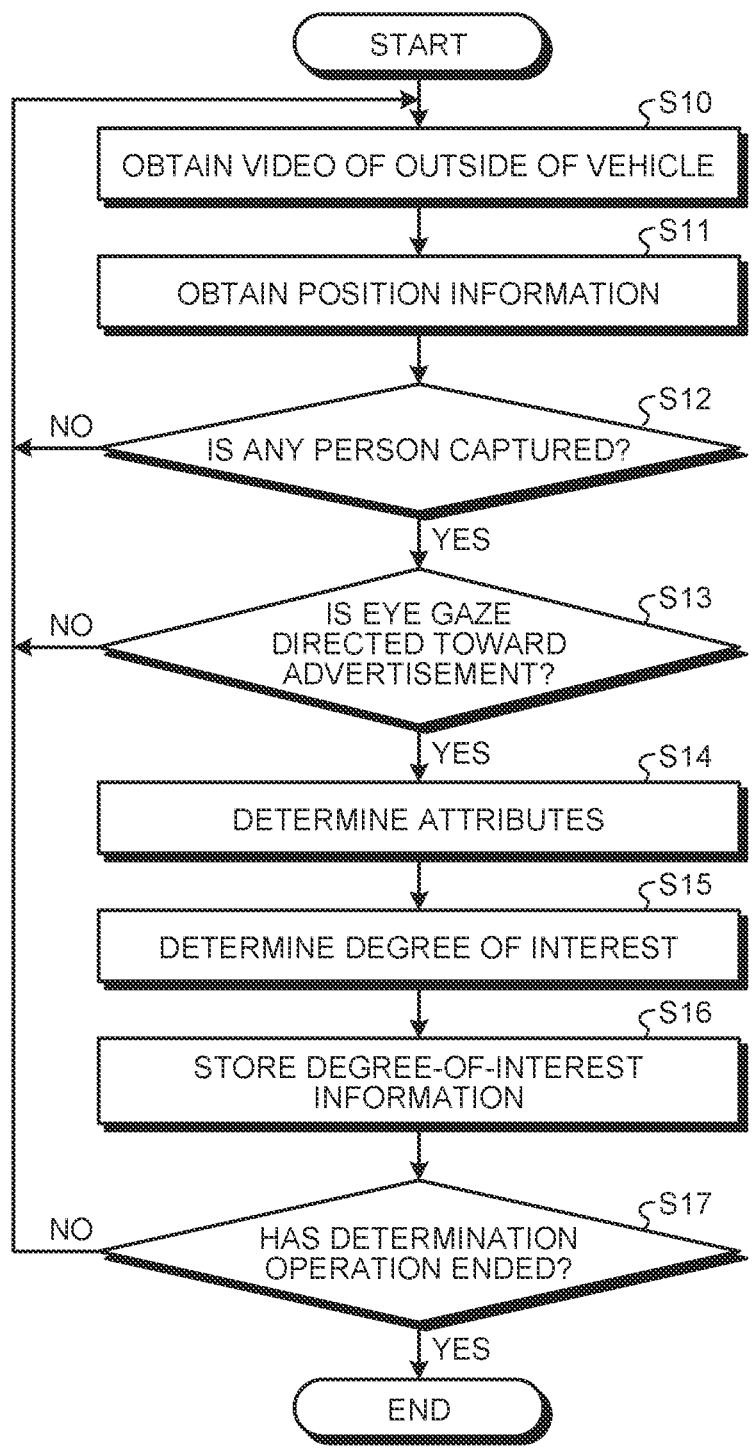

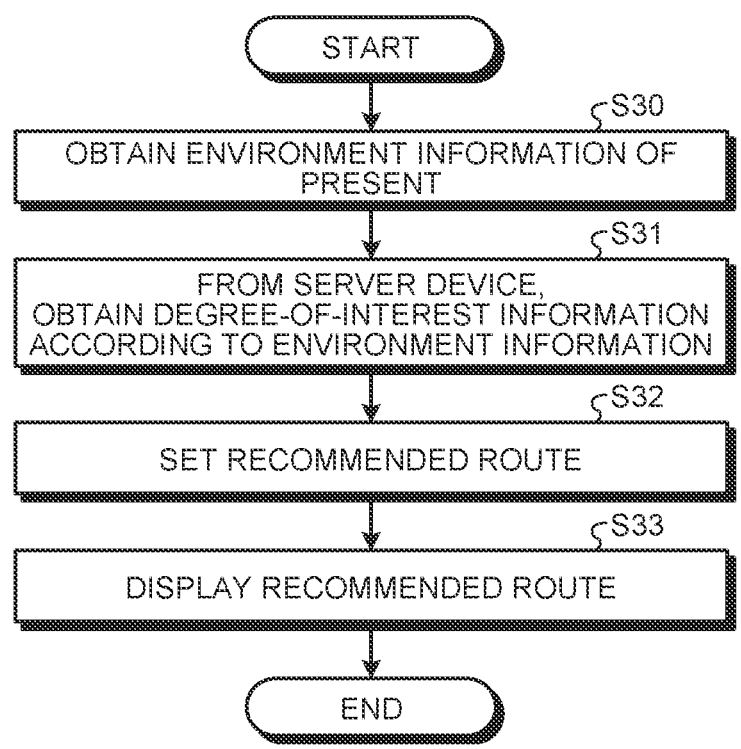

INFORMATION PROCESSING DEVICE, INFORMATION PROCESSING SYSTEM, AND INFORMATION PROCESSING METHOD

CROSS-REFERENCE TO RELATED APPLICATIONS

This application is a Continuation of PCT International Application No. PCT/JP2020/029462 filed on Jul. 31, 2020 which claims the benefit of priority from Japanese Patent Application No. 2019-232444 filed on Dec. 24, 2019, the entire contents of which are incorporated herein by reference.

BACKGROUND

1. Field of the Invention

The application concerned is related to an information processing device, an information processing system, and an information processing method.

2. Description of the Related Art

Advertisement display vehicles are known that move around while displaying advertisements of products. As a result of moving around while displaying advertisements, an advertisement display vehicle advertises products to the pedestrians.

For example, in Japanese Patent Application Laid-open No. 2013-20432 is disclosed a technology that enables enhancing the ripple effect of the advertisements displayed in a presentation device installed in a vehicle, as well as enables evaluating the advertising effectiveness in an appropriate manner.

Depending on the content of the advertisement displayed on an advertisement display vehicle, there occurs a change in the attributes (for example, the age and the gender) and the degrees of interest of the persons for whom the advertisements are of interest. Moreover, depending on the route taken by the advertisement display vehicle as well as depending on the day, the time, and the weather; there occurs a change in the count and the attributes of the pedestrians walking on the road. Hence, even if an advertisement display vehicle moves around while displaying advertisements, depending on the advertising content and the route, there is a possibility that the advertising effectiveness is not achieved to a sufficient extent. As far as the route of the advertisement display vehicle is concerned, based on the degrees of interest with respect to the advertisements and based on the attributes of the persons to whom the advertisements are of interest, it is desirable that an appropriate route is set.

The application concerned enables providing an information processing device, an information processing system, and an information processing method that enable setting an appropriate route.

SUMMARY

An information processing device according to an aspect of the application concerned includes a video obtaining unit that obtains a video of outside of a vehicle as taken by a camera installed in the vehicle, a position information obtaining unit that obtains position information of the vehicle, a person detecting unit that detects a person based on a face image included in the video obtained by the video obtaining unit, an eye gaze direction determining unit that determines direction of eye gaze of the person detected by the person detecting unit, a degree-of-interest determining unit that, based on the direction of eye gaze as determined by the eye gaze direction determining unit, determines degree of vehicle interest with respect to the vehicle, and a route setting unit that associates the position information and the degree of vehicle interest, and sets a route to be taken.

An information processing system according to an aspect of the application concerned includes an information processing device according to an aspect of the application concerned, and includes a server device that obtains vehicle information from the information processing device.

An information processing method according to an aspect of the application concerned includes obtaining a video of outside of a vehicle as taken by a camera installed in the vehicle, obtaining position information of the vehicle, detecting a person based on a face image included in the obtained video, determining direction of eye gaze of the detected person, determining, based on the determined direction of eye gaze, degree of vehicle interest with respect to the vehicle, and setting that includes associating the position information and the degree of vehicle interest, and setting a route to be taken.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram for explaining a method for determining the degrees of interest;

FIG. 4 is a diagram for explaining a method for determining the degrees of interest in a weighted form;

FIG. 5 is a diagram for explaining a method for determining the ratio of the persons who showed interest in an advertisement;

FIG. 6 is a diagram for explaining degree-of-interest information;

FIG. 8A is a flowchart for explaining an exemplary flow of a degree-of-interest determination operation performed in the information processing device according to the first embodiment;

FIG. 9 is a flowchart for explaining an exemplary flow of operations performed in the information processing device according to the first embodiment;

DETAILED DESCRIPTION OF THE PREFERRED EMBODIMENTS

Figure 1:
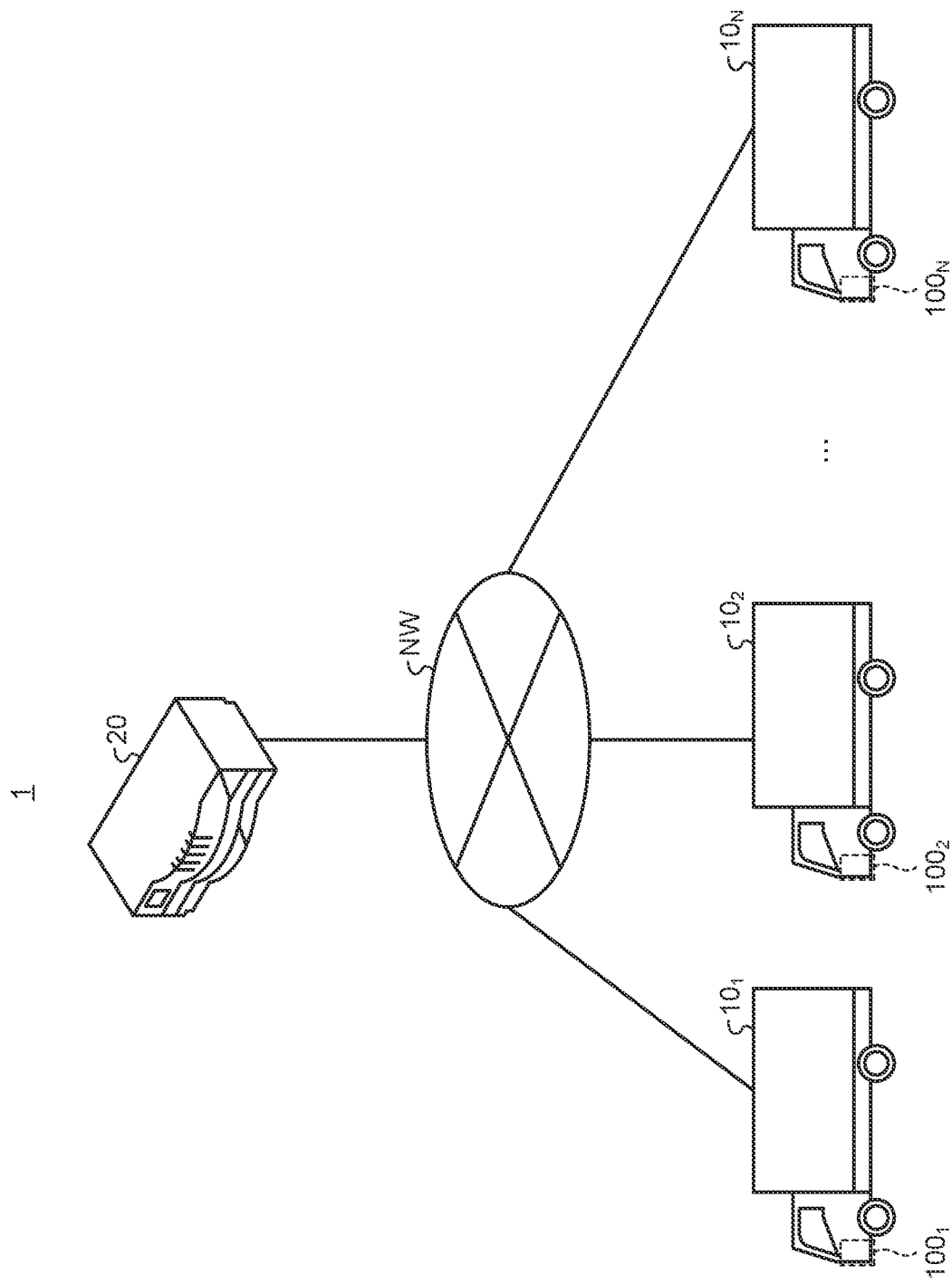
FIG. 1 is a diagram for explaining an exemplary configuration of an information processing system according to a first embodiment.

Exemplary embodiments of the application concerned are described below in detail with reference to the accompanying drawings. However, the application concerned is not limited by the embodiments described below. Moreover, when there is a plurality of embodiments, combinations thereof are also to be taken into account. In the embodiments described below, the same constituent elements are referred to by the same reference numerals, and their explanation is not given repeatedly.

First Embodiment

Explained below with reference to FIG. 1 is a configuration of an information processing system according to a first embodiment. FIG. 1 is a diagram for explaining an exemplary configuration of the information processing system according to the first embodiment.

As illustrated in FIG. 1, an information processing system 1 includes advertisement display vehicles $10_1, 10_2, \ldots, 10_N$ (where N is an integer equal to or greater than three) and a server device 20. The advertisement display vehicles $10_1, 10_2, \ldots, 10_N$ include information processing devices $100_1, 100_2, \ldots, 100_N$, respectively. The information processing devices $100_1, 100_2, \ldots, 100_N$ are communicably connected to the server device 20 via a wireless network NW. Examples of the network NW include the Internet.

Each of the advertisement display vehicles $10_1, 10_2, \ldots, 10_N$ runs a route within a preset area. Each of the advertisement display vehicles $10_1, 10_2, \ldots, 10_N$ has advertisements displayed thereon and, while running the route, does the advertising with respect to the pedestrians walking on the footpath. The advertisement display vehicles $10_1, 10_2, \ldots, 10_N$ are sometimes collectively referred to as advertisement display vehicles 10.

From an in-vehicle camera installed in the advertisement display vehicles $10_1, 10_2, \ldots, 10_N$; the information processing devices $100_1, 100_2, \ldots, 100_N$ detect the persons present on the respective routes at the time when the advertisement display vehicles $10_1, 10_2, \ldots, 10_N$ are running. Then, from among the extracted persons, the information processing devices $100_1, 100_2, \ldots, 100_N$ extract the persons who are paying attention to the advertisement display vehicles $10_1, 10_2, \ldots, 10_N$, respectively. Moreover, the information processing devices $100_1, 100_2, \ldots, 100_N$ determine the attributes of the corresponding extracted persons. Furthermore, the information processing devices $100_1, 100_2, \ldots, 100_N$ calculate the degrees of interest of the extracted persons with respect to the advertisement display vehicles $10_1, 10_2, \ldots, 10_N$, respectively. Then, based on the calculated degrees of interest, the information processing devices $100_1, 100_2, \ldots, 100_N$ decide on the respective routes that should be taken. The information processing devices $100_1, 100_2, \ldots, 100_N$ then present the decided routes to their users. The information processing devices $100_1, 100_2, \ldots, 100_N$ are sometimes collectively referred to as information processing devices 100.

Figure 2:
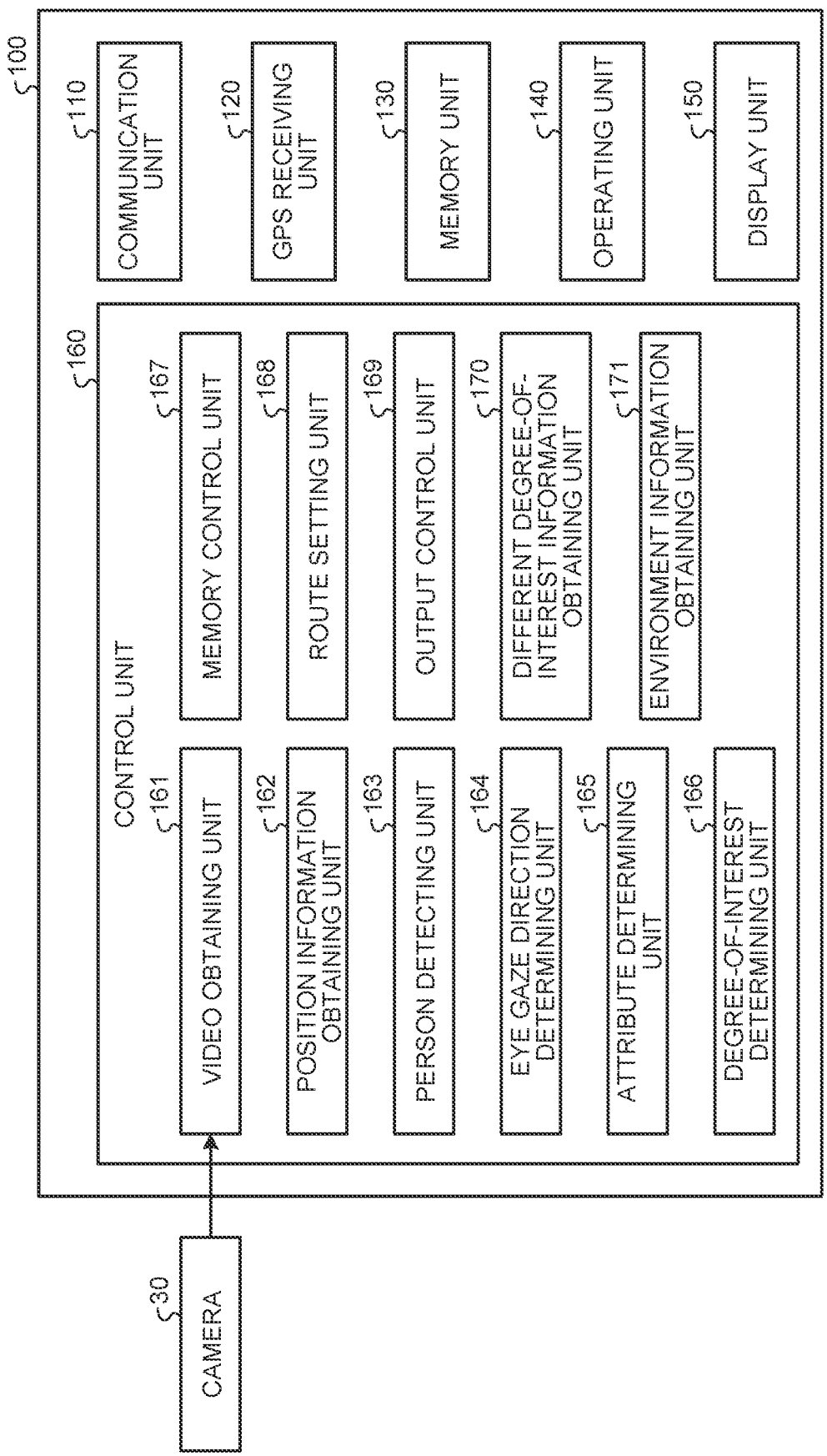
FIG. 2 is a block diagram illustrating an exemplary configuration of an information processing device according to the first embodiment.

Explained below with reference to FIG. 2 is a configuration of the information processing device according to the first embodiment. FIG. 2 is a block diagram illustrating an exemplary configuration of the information processing device according to the first embodiment.

As illustrated in FIG. 2, the information processing device 100 includes a communication unit 110, a GPS receiving unit 120 (GPS stands for Global Positioning System), a memory unit 130, an operating unit 140, a display unit 150, and a control unit 160.

The communication unit 110 is implemented using, for example, a network interface card (NIC) or a communication circuit. The communication unit 110 is connected to the network NW in a wireless manner. Thus, via the network NW, the communication unit 110 sends information to and receives information from other devices. For example, via the network NW, the communication unit 110 sends information to and receives information from the server device 20.

The GPS receiving unit 120 is configured with a GPS receiving circuit and a GPS receiving antenna, and receives GPS signals. Then, the GPS receiving unit 120 outputs the received signals to a position information obtaining unit 162.

The memory unit 130 is implemented using a data readable-writable memory device such as a dynamic random access memory (DRAM), a static random access memory (SRAM), a flash memory, or a hard disk. The memory unit 130 is used to store a variety of information related to the information processing device 100. For example, the memory unit 130 is used to store the information related to the degrees of interest with respect to the advertisement display vehicle in which the information processing device 100 is installed. Moreover, for example, the memory unit 130 is used to store dictionary data to be used in the person recognition and face recognition.

The operating unit 140 receives various operations from the user. Then, the operating unit 140 outputs, for example, electrical signals according to the operations to the control unit 160. The operating unit 140 is implemented using, for example, physical switches or a touch-sensitive panel.

The display unit 150 displays various videos. For example, the display unit 150 displays the recommended route that should be taken by the advertisement display vehicle in which the information processing device 100 is installed. The display unit 150 is, for example, a liquid crystal display (LCD) or an organic electro-luminescence (EL) display. When the operating unit 140 is configured using a touch-sensitive panel, it is integrated with the display unit 150.

The control unit 160 includes a video obtaining unit 161, the position information obtaining unit 162, a person detecting unit 163, an eye gaze direction determining unit 164, an attribute determining unit 165, a degree-of-interest determining unit 166, a memory control unit 167, a route setting unit 168, an output control unit 169, a different degree-of-interest information obtaining unit 170, and an environment information obtaining unit 171.

The control unit 160 is a controller that controls the constituent elements of the information processing device 100. The control unit 160 is implemented using, for example, a processor such as a central processing unit (CPU) or a micro processing unit (MPU). For example, the control unit 160 is implemented when the processor executes various computer programs stored in an internal memory device, while using a random access memory (RAM) as the work area. Meanwhile, the control unit 160 can alternatively be implemented using an integrated circuit such as an application specific integrated circuit (ASIC) or a field programmable gate array (FPGA). Still alternatively, the control unit 160 can be implemented using a combination of software and hardware.

The video obtaining unit 161 obtains a variety of video data. The video obtaining unit 161 obtains video data taken by a camera 30 that is installed in the advertisement display vehicle in which the information processing device 100 is installed. For example, the camera 30, which is installed in the advertisement display vehicle in which the information processing device 100 is installed, obtains video data in which the persons on the road are captured while the advertisement display vehicle is running around. In the first embodiment, the camera 30 takes images of the surrounding of the advertisement display vehicle. For example, the camera 30 is an omnidirectional camera that takes images of the surrounding of the advertisement display vehicle. Alternatively, for example, the camera 30 can be a front camera that takes images of the front side of the advertisement display vehicle, or can be a side camera that takes images of a side of the advertisement display vehicle, or a rear camera that takes images of the rear side of the advertisement display vehicle. Still alternatively, the camera 30 can be configured using a combination of a front camera, side cameras, and a rear camera.

The position information obtaining unit 162 obtains the current position information of the advertisement display vehicle in which the information processing device 100 is installed. For example, based on the GPS signals received by the GPS receiving unit 120, the position information obtaining unit 162 obtains the position information of the advertisement display vehicle.

The person detecting unit 163 detects whether or not any person is captured in the video data obtained by the video obtaining unit 161. For example, based on face images extracted from the video data, the person detecting unit 163 detects whether or not persons are captured. If a face image is extracted from the video data, then the person detecting unit 163 determines that a person is captured in the video data. For example, based on the dictionary data stored in the memory unit 130, the person detecting unit 163 detects persons and their faces. Moreover, the person detecting unit 163 can also calculate the number of persons included in the video data. Furthermore, the person detecting unit 163 can calculate the number of persons included in the shooting range of the camera 30. The person detecting unit 163 can calculate the number of persons present within a predetermined range (for example, 1 square meter) inside the shooting range of the camera 30.

The eye gaze direction determining unit 164 determines the eye gaze direction of each person who is detected by the person detecting unit 163. For example, the eye gaze direction determining unit 164 determines the orientation of the face from the face image of a person, and accordingly determines the eye gaze direction of that person. For example, the eye gaze direction determining unit 164 determines, from the face image of a person, the outlines of the eyes and the positions of the irises, and accordingly determines the eye gaze direction of the person. The eye gaze direction determining unit 164 determines whether or not the eye gaze direction of the person was in the direction of visually checking the advertisement displayed on the advertisement display vehicle in which the information processing device 100 is installed.

The attribute determining unit 165 determines the attributes of each person who is detected by the person detecting unit 163. For example, based on the face image of a person, the attribute determining unit 165 determines the attributes of that person. The attributes determined by the attribute determining unit 165 include the information about the age and the gender of the person. Moreover, the attributes determined by the attribute determining unit 165 can also include other information.

Based on the determination result obtained by the eye gaze direction determining unit 164, the degree-of-interest determining unit 166 determines the degree of interest of a person with respect to the advertisement displayed on the advertisement display vehicle. The degree-of-interest determining unit 166 determines, for each attribute of the person, the degree of interest with respect to the advertisement displayed on the advertisement display vehicle. When the person casts a glance at the advertisement, the degree-of-interest determining unit 166 determines that the person has interest in the advertisement displayed on the advertisement display vehicle. The degree-of-interest determining unit 166 determines that the degree of interest with respect to the advertisement is higher in proportion to the period of time for which the person glances at the advertisement. Moreover, the degree-of-interest determining unit 166 determines that the degree of interest with respect to the advertisement is higher in proportion to the number of times for which the person casts a glance at the advertisement within a predetermined period of time.

Explained below with reference to FIG. 3 is the method for determining the degrees of interest. FIG. 3 is a diagram for explaining the method for determining the degrees of interest.

In FIG. 3, the person-by-person degrees of interest are illustrated in a table. Regarding the first person, the age is in the "teens", the gender is "female", and the degree of interest is "P1". Regarding the second person, the age is in the "20s", the gender is "male", and the degree of interest is "P2". Regarding the third person, the age is in the "30s", the gender is "male", and the degree of interest is "P3". Regarding the fourth person, the age is in the "40s", the gender is "female", and the degree of interest is "P4". Thus, as illustrated in FIG. 3, the degree-of-interest determining unit 166 determines, for each person, the attributes, such as the age and the gender, and the degree of interest in a corresponding manner.

In FIG. 3, the degrees of interest are illustrated in a conceptual manner such as P1 to P4. However, in practice, they are illustrated using specific numerical values. For example, when the advertisement is visually checked even once, the degree-of-interest determining unit 166 can determine that the degree of interest is equal to "1". On the other hand, when the advertisement is not visually checked at all, the degree-of-interest determining unit 166 can determine that the degree of interest is equal to "0". For example, according to the period of time of visually checking the advertisement and according to the number of times of visually checking the advertisement within a predetermined period of time, the degree-of-interest determining unit 166 can determine the degree of interest in a stepwise manner, such as "1", "2,", "3", "4", and "5". In that case, for example, a greater number implies a higher degree of interest. Meanwhile, the degree-of-interest determining unit 166 can calculate the average value of the attribute-by-attribute degrees of interest.

Moreover, according to the content of the advertisement, the degree-of-interest determining unit 166 can determine the degrees of interest in a weighted form.

Explained below with reference to FIG. 4 is the method for determining the degrees of interest in a weighted form.

FIG. 4 is a diagram for explaining the method for determining the degrees of interest in a weighted form.

In FIG. 4, the weighted degree of interest is illustrated for each person illustrated in the table in FIG. 3. Regarding the first person, the weight is "W1" and the degree of interest is "P1×W1". Regarding the second person, the weight is "W2" and the degree of interest is "P2×W2". Regarding the third person, the weight is "W3" and the degree of interest is "P3×W3". Regarding the fourth person, the weight is "W4" and the degree of interest is "P4×W4".

In FIG. 4, the weights are illustrated in a conceptual manner such as W1 to W4. However, in practice, they are illustrated using specific numerical values. The value of a weight is defined by the relationship between the attributes of the concerned person and the target demographic of the advertisement. For example, when women in their teens are the target demographic of the advertisement, then the value of the weight "W1" increases and the value of the weight "W3" decreases. Meanwhile, the magnitude of the weights can also be set at the discretion of the user. Thus, the specific value of each weight can be arbitrarily set by the user according to the content of the advertisement.

Moreover, from among the persons captured in a video, the degree-of-interest determining unit 166 can determine the ratio of the persons who showed interest in the advertisement.

Explained below with reference to FIG. 5 is the method for determining the ratio of the persons who showed interest in the advertisement. FIG. 5 is a diagram for explaining the method for determining the ratio of the persons who showed interest in the advertisement.

In FIG. 5, with respect to an "advertisement C1", the ratio of the persons showing interest in the "advertisement C1" is illustrated on an attribute-by-attribute basis in a table. From among the "male" in the "teens", a ratio "R1" of the men showed interest in the "advertisement C1". From among the "female" in the "teens", a ratio "R2" of the women showed interest in the "advertisement C1". From among the "male" in the "20s", a ratio "R3" of the men showed interest in the "advertisement C1". From among the "female" in the "20s", a ratio "R4" of the men showed interest in the "advertisement C1". Meanwhile, with respect to all persons who showed interest in the "advertisement C1", the degree-of-interest determining unit 166 can calculate the ratio for each attribute. In other words, the degree-of-interest determining unit 166 can calculate the ratio as (the number of persons who have an attribute A and who showed interest in the advertisement C1)/(the total number of persons having the attribute A); or can calculate the ratio as (the number of persons who have the attribute A and who showed interest in the advertisement C1)/(the total number of persons who showed interest in the advertisement C1).

In FIG. 5, the ratios are illustrated in a conceptual manner such as R1 to R4. However, in practice, they are illustrated using specific numerical values.

The memory control unit 167 stores a variety of information in the memory unit 130. The memory control unit 167 stores, in the memory unit 130, the tables illustrated in FIGS. 3, 4, and 5. Moreover, the memory control unit 167 stores, in the memory unit 130, degree-of-interest information in which the position information obtained by the position information obtaining unit 162 is held in a corresponding manner to the degree of interest determined by the degree-of-interest determining unit 166. Furthermore, the memory control unit 167 can also associate, to the degree-of-interest information, the imaging direction of the camera and environment information obtained by the environment information obtaining unit 171 (explained later). Then, the memory control unit 167 stores the degree-of-interest information in the server device 20 via the communication unit 110. As a result of storing the degree-of-interest information in the server device 20, the degree-of-interest information can be shared among the information processing devices installed in the other advertisement display vehicles.

Explained below with reference to FIG. 6 is the degree-of-interest information. FIG. 6 is a diagram for explaining the degree-of-interest information.

In FIG. 6 is illustrated a table of the average values of the attribute-by-attribute degrees of interest with respect to the "advertisement C1" at a "location A". In the example illustrated in FIG. 6, for example, regarding the "male" in the "teens", the degrees of interest with respect to the "advertisement C1" have the average value of "P11". Regarding the "female" in the "teens", the degrees of interest with respect to the "advertisement C1" have the average value of "P12". The memory control unit 167 stores, in the memory unit 130, the degrees of interest with respect to the advertisement C1 at each location.

In FIG. 6, the average values of the degrees of interest are illustrated in a conceptual manner such as P11 to P16. However, in practice, they are illustrated using specific numerical values.

Returning to the explanation with reference to FIG. 2, the route setting unit 168 sets the recommended route that should be taken by the advertisement display vehicle. The route setting unit 168 sets the recommended route based on the degree-of-interest information stored in the memory unit 130 and the server device 20. Based on the degree-of-interest information, the route setting unit 168 sets the recommended route to include the locations at which there is a high degree of interest with respect to the advertisement. In other words, the route setting unit 168 sets, as the recommended route, a route that has high advertising effectiveness for the advertisement. As the volume of the degree-of-interest information stored in the server device 20 goes on increasing, the route setting unit 168 can set, with more accuracy, the route having high advertising effectiveness for the advertisement.

The output control unit 169 outputs, to the display unit 150, the information related to the route that should be taken as set by the route setting unit 168. Thus, the route that should be taken is displayed in the display unit 150.

The different degree-of-interest information obtaining unit 170 obtains, from the server device 20 via the communication unit 110, different sets of degree-of-interest information stored in the other information processing devices that are installed in the other advertisement display vehicles. The different sets of degree-of-interest information contain the information related to the location-by-location degrees of interest with respect to a specific advertisement as calculated by the information processing devices installed in the other advertisement display vehicles.

The environment information obtaining unit 171 obtains a variety of environment information via the communication unit 110. The environment information contains information such as the date, the time, and the weather. Moreover, the environment information can contain some other information too.

Figure 7:
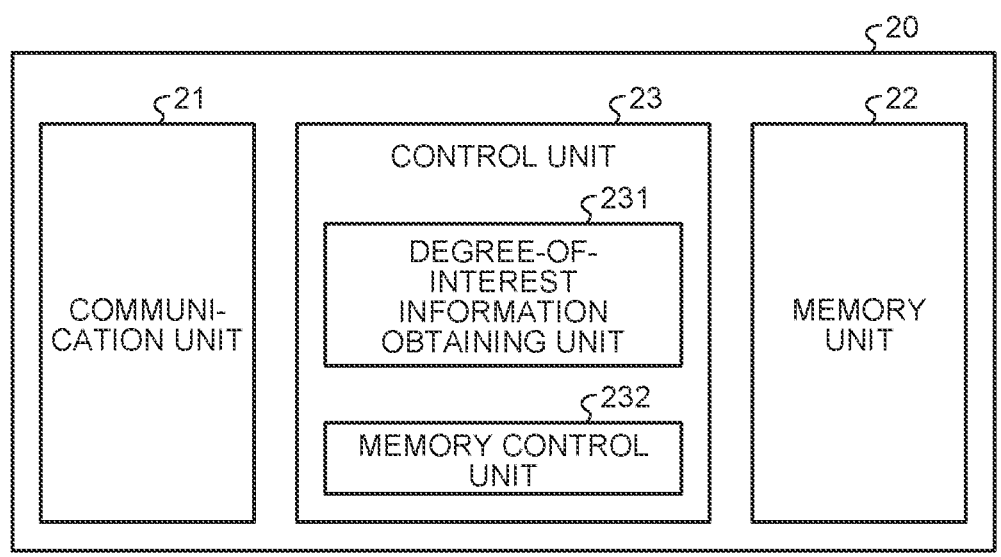
FIG. 7 is a block diagram illustrating an exemplary configuration of a server device according to the first embodiment.

Explained below with reference to FIG. 7 is a configuration of the server device according to the first embodiment. FIG. 7 is a block diagram illustrating an exemplary configuration of the server device according to the first embodiment.

As illustrated in FIG. 7, the server device 20 includes a communication unit 21, a memory unit 22, and a control unit 23.

The communication unit 21 is implemented using, for example, an NIC or a communication circuit. Moreover, the communication unit 21 is connected to the network NW in a wireless manner. The communication unit 21 sends information to and receives information from other devices via the network NW. For example, the communication unit 21 sends information to and receives information from the information processing devices $100_1$ to $100_N$ via the network NW.

The memory unit 22 is implemented using a computer readable-writable memory medium such as a DRAM, an SRAM, a flash memory, or a hard disk. The memory unit 22 is used to store a variety of information related to the server device 20. For example, the memory unit 22 is used to store the degree-of-interest information obtained from the information processing devices $100_1$ to $100_N$.

The control unit 23 includes a degree-of-interest information obtaining unit 231 and a memory control unit 232.

The control unit 23 is a controller that controls the constituent elements of the server device 20. The control unit 23 is implemented using, for example, a processor such as a CPU or an MPU. For example, the control unit 23 is implemented when the processor executes various computer programs stored in an internal memory device, while using a random access memory (RAM) as the work area. Meanwhile, the control unit 23 can alternatively be implemented using an integrated circuit such as an ASIC or an FPGA. Still alternatively, the control unit 23 can be implemented using a combination of software and hardware.

The degree-of-interest information obtaining unit 231 obtains the degree-of-interest information from the information processing devices $100_1$ to $100_N$. Since the degree-of-interest information obtaining unit 231 obtains the degree-of-interest information from the information processing devices $100_1$ to $100_N$, the information processing devices $100_1$ to $100_N$ become able to share the corresponding degree-of-interest information.

The memory control unit 232 stores, in the memory unit 22, the degree-of-interest information obtained by the degree-of-interest information obtaining unit 231.

Figure 8B:
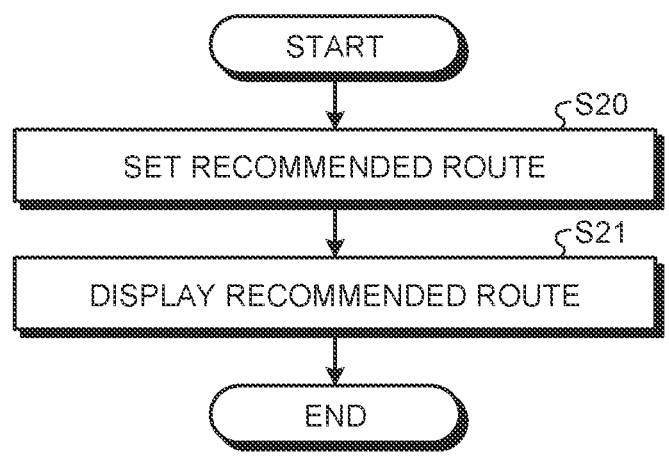
FIG. 8B is a flowchart for explaining an exemplary flow of a recommended-route display operation performed in the information processing device according to the first embodiment.

Explained below with reference to FIGS. 8A and 8B is the flow of operations performed in the information processing device according to the first embodiment. FIG. 8A is a flowchart for explaining an exemplary flow of a degree-of-interest determination operation performed in the information processing device according to the first embodiment. FIG. 8B is a flowchart for explaining an exemplary flow of a recommended-route display operation performed in the information processing device according to the first embodiment.

Explained below with reference to FIG. 8A is the degree-of-interest determination operation performed in the information processing device 100. The control unit 160 obtains a video of the outside of the vehicle (Step S10). More particularly, the video obtaining unit 161 obtains a video of the outside from the camera 30 installed in the advertisement display vehicle in which the information processing device 100 is installed. Then, the system control proceeds to Step S11.

The control unit 160 obtains the position information (Step S11). More particularly, the position information obtaining unit 162 obtains the position information of the same position regarding which the video obtaining unit 161 obtained the video from the camera 30. Then, the system control proceeds to Step S12.

The control unit 160 detects whether or not any person is captured in the video obtained at Step S10 (Step S12). More particularly, based on the face images included in the video, the person detecting unit 163 detects whether or not any persons are captured. If it is determined that a person is captured (Yes at Step S12), then the system control proceeds to Step S13. On the other hand, if it is determined that no person is captured (No at Step S12), then the system control returns to Step S10, and the control unit 160 again performs the operations.

When it is determined that a person is captured (Yes at Step S12), the control unit 160 determines whether or not the eye gaze direction of the person is directed toward the advertisement (Step S13). More particularly, the eye gaze direction determining unit 164 determines the direction of the face and the positions of the eyes based on the face image of the person. Then, based on the direction of the face and the positions of the eyes, the eye gaze direction determining unit 164 determines whether or not the eye gaze is directed toward the advertisement. If it is determined that the eye gaze is directed toward the advertisement (Yes at Step S13), then the system control proceeds to Step S14. On the other hand, if it is determined that the eye gaze is not directed toward the advertisement (No at Step S13), then the system control returns to Step S10, and the control unit 160 again performs the operations.

When it is determined that the eye gaze is directed toward the advertisement (Yes at Step S13), the control unit 160 determines the attributes of that person (Step S14). More particularly, the attribute determining unit 165 determines the gender and the age of the person. Then, the system control proceeds to Step S15.

The control unit 160 determines the degree of interest with respect to the advertisement (Step S15). More particularly, the degree-of-interest determining unit 166 determines the degree of interest with respect to the advertisement based on the information related to the eye gaze of the person and the attributes of the person. Then, the system control proceeds to Step S16.

The control unit 160 stores the degree-of-interest information (Step S16). More particularly, the memory control unit 167 stores, in the memory unit 130 and the server device 20, the degree-of-interest information in which the degree of interest and the position information is held in a corresponding manner. Then, the system control proceeds to Step S17.

The control unit 160 determines whether or not the degree-of-interest determination operation has ended (Step S17). More particularly, depending on whether or not the camera 30 has ended the imaging or depending on whether or not the engine of the imaging vehicle is switched off, the control unit 160 determines whether or not the degree-of-interest determination operation has ended. If it is determined that the degree-of-interest determination operation has ended (Yes at Step S17), then it marks the end of the operations illustrated in FIG. 8A. On the other hand, if it is determined that the degree-of-interest determination operation has not ended (No at Step S17), then the system control returns to Step S10, and the control unit 160 again performs the operations. Thus, while the degree-of-interest determination operation is underway, the control unit 160 repeatedly performs the operations from Step S10 to Step S16.

Explained below with reference to FIG. 8B is the recommended-route display operation performed in the information processing device 100. The control unit 160 sets the recommended route that should be taken (Step S20). More particularly, the route setting unit 168 sets the recommended route based on the degree-of-interest information stored in the memory unit 130. Then, the system control proceeds to Step S21.

The control unit 160 displays the recommended route (Step S21). More particularly, the output control unit 169 displays the recommended route along with map information in the display unit 150. It marks the end of the operations illustrated in FIG. 8B.

As illustrated in FIGS. 8A and 8B, in the information processing device 100, the recommended route is set and displayed based on the degrees of interest stored in the memory unit 130. However, the application concerned is not limited to that case. Alternatively, for example, while the advertisement display vehicle is being driven, the information processing device 100 can obtain the degree-of-interest information from the server device 20 and set the recommended route.

Explained below with reference to FIG. 9 is the flow of operations performed in the information processing device according to the first embodiment in the case of obtaining the degree-of-interest information from the server device. FIG. 9 is a flowchart for explaining an exemplary flow of operations performed in the information processing device according to the first embodiment in the case of obtaining the degree-of-interest information from the server device.

The control unit 160 obtains the current environment information (Step S30). More particularly, the environment information obtaining unit 171 obtains, from external devices via the communication unit 110, the environment information such as the current date, the current time, and the current weather. Then, the system control proceeds to Step S31.

The control unit 160 obtains the degree-of-interest information according to the current environment information from the server device (Step S31). More particularly, the different degree-of-interest information obtaining unit 170 obtains, from the server device 20, the degree-of-interest information corresponding to similar conditions to the current environment information. Then, the system control proceeds to Step S32.

The control unit 160 sets the recommended route that should be taken (Step S32). More particularly, the route setting unit 168 sets the recommended route based on the degree-of-interest information obtained from the server device 20. Then, the system control proceeds to Step S33.

The control unit 160 displays the recommended route (Step S33). More particularly, the output control unit 169 displays the recommended route along with map information in the display unit 150. It marks the end of the operations illustrated in FIG. 9.

As explained above, in the first embodiment, the information processing device 100 can calculate the degrees of interest of the pedestrians with respect to the advertisement. Moreover, in the first embodiment, according to the degrees of interest of the pedestrians, the recommended route can be set to the route that includes the locations at which a large number of pedestrians show interest in the advertisement; and the recommended route can be provided to the driver of the advertisement display vehicle. As a result, in the first embodiment, it becomes possible to take the route that has high advertising effectiveness.

In the first embodiment, since the degrees of interest are determined based on the eye gaze direction of the pedestrians, it is desirable that the route taken by the advertisement display vehicle 10 is a route in which it is easy to take images of the faces of the pedestrians. For example, it is desirable that the route taken by the advertisement display vehicle 10 is a route in the outskirts having a commanding view, or a double-lane route in which it is easy to confirm the pedestrians, or a route in a residential neighborhood. For example, it is desirable that the route taken by the advertisement display vehicle 10 is not an arterial highway.

In the first embodiment, in the route taken by the advertisement display vehicle 10, the information processing device 100 can determine the degree of interest with respect to the advertisement for each attribute such as the age and the gender. Hence, for example, even if the advertisement display vehicle 10 is running with advertisements targeting women displayed thereon, it is still possible to detect the men who are present in the route. As a result, in the first embodiment, a route that includes locations at which a large number of men are detected can be determined as the route that should be taken when advertisements targeting men are displayed.

In the first embodiment, as the volume of the degree-of-interest information stored in the server device 20 goes on increasing, the route having high advertising effectiveness can be set with more accuracy. Hence, it is desirable that the degree-of-interest information stored in the server device 20 is updated as needed. The area within which the advertisement display vehicle 10 can be driven is fixed in advance. Moreover, for example, the range of deviation from the area within which the advertisement display vehicle 10 can be driven is also fixed in advance. Thus, it is desirable that the driver of the advertisement display vehicle 10 varies the conditions such as the day, the time, the weather, and the route; drives in the predetermined area while combining the conditions; and obtains the degree-of-interest information. While obtaining the degree-of-interest information, when a location having a large number of pedestrians is found, it is desirable that the driver of the advertisement display vehicle 10 drives to that location within the allowed range for deviation and obtains the degree-of-interest information. Even when driving on the recommended route, for example, if a large number of pedestrians are present on a route away from the recommended route, then the driver of the advertisement display vehicle 10 can drive on that route within the allowed range for deviation and obtain the degree-of-interest information.

In the first embodiment, the degree-of-interest information can be shared among a plurality of advertisement display vehicles $10_1$ to $10_N$. In that case, the route taken by each of the advertisement display vehicles $10_1$ to $10_N$ can be same or can be different.

Second Embodiment

Given below is the explanation of a second embodiment.

Figure 10:
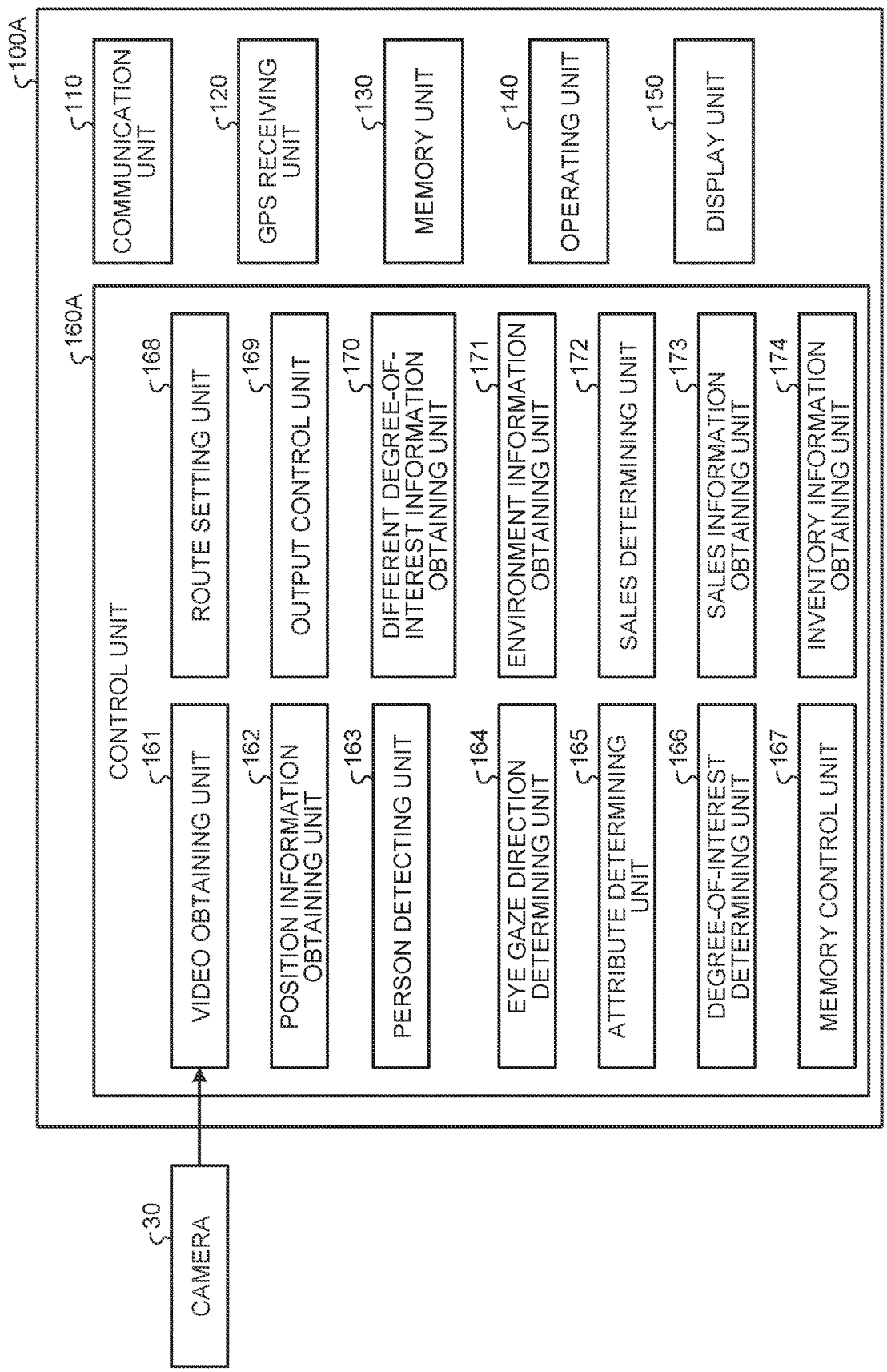
FIG. 10 is a block diagram illustrating an exemplary configuration of an information processing device according to a second embodiment.

Explained below with reference to FIG. 10 is an information processing device according to the second embodiment. FIG. 10 is a block diagram illustrating an exemplary configuration of the information processing device according to the second embodiment.

As illustrated in FIG. 10, as compared to the information processing device 100 illustrated in FIG. 2, an information processing device 100A differs in the way that a control unit 160A additionally includes a sales determining unit 172, a sales information obtaining unit 173, and an inventory information obtaining unit 174.

In the first embodiment, the information processing device 100 is installed in an advertisement display vehicle that runs with advertisements displayed thereon. In contrast, the information processing device 100A can be installed in a mobile sales vehicle used for selling products on the move.

The sales determining unit 172 determines the sale proceeds of the products. Based on the sales information of the products, the sales determining unit 172 determines whether or not the sale proceeds of the products have reached a predetermined amount. Moreover, the sales determining unit 172 determines whether or not the sale proceeds of the products within a predetermined period of time have reached a predetermined amount. Regarding the set amount for the products, for example, the user can set the amount in an arbitrary manner using the operating unit 140.

The sales information obtaining unit 173 obtains, from the server device 20 via the communication unit 110, the sales information related to the sale proceeds of the products in other mobile sales vehicles. Thus, the sales information obtaining unit 173 can obtain the sales information related to the overall sale proceeds of all products available in the other mobile sales vehicle, or can obtain the sales information related to the sale proceeds on a product-by-product basis. Alternatively, the sales information obtaining unit 173 can obtain the sales information of only those products for which the sale proceeds have reached a predetermined level.

The inventory information obtaining unit 174 obtains, from the server device 20 via the communication unit 110, inventory information related to the inventory available in the other mobile sales vehicles. The inventory information contains, for example, information about the inventory quantity and the inventory money amount. The inventory information obtaining unit 174 can obtain the inventory information about the overall inventory of all products available in the other mobile sales vehicles, or can obtain the inventory information about the inventory on a product-by-product basis. Alternatively, the inventory information obtaining unit 174 can obtain the inventory information of only the products having the inventory quantity to be smaller than a predetermined level.

In a mobile sales vehicle, in order to enable the pedestrians to understand what is being sold, a sign indicating the products on sale is hung out. The information processing device 100A determines that, higher the degree of interest with respect to the sign, the higher is the desire of a pedestrian to purchase a product. Thus, the information processing device 100A sets, as the recommended route, the route in which there are a large number of pedestrians showing a high degree of interest with respect to the sign. Moreover, the information processing device 100A sets, as the recommended location, the location at which there are a large number of pedestrians showing a high degree of interest with respect to the sign. However, if the sale proceeds within a predetermined period of time do not reach a preset amount, then the information processing device 100A sets a new recommended route or sets a new recommended location.

The mobile sales vehicle can be a manual driving vehicle or an autonomous driving car. The levels of autonomous driving are divided into stages from 0 to 5. In the second embodiment, when the mobile sales vehicle is a mobile sales vehicle, the level of autonomous driving is set to, for example, a high level (for example, the level 4 or the level 5). When the mobile sales vehicle is a manual driving vehicle, the driver drives on the recommended route set by the information processing device 100A for selling the products.

When the mobile sales vehicle is an autonomous driving vehicle, it autonomously runs on the recommended route for selling the products. Moreover, when the mobile sales vehicle is an autonomous driving vehicle, it autonomously runs to the recommended location for selling the products. If the sale proceeds within a predetermined period of time do not reach a preset amount, then the mobile sales vehicle runs on the newly-set recommended route or runs to the newly-set recommended location, and sells the products.

Figure 11:
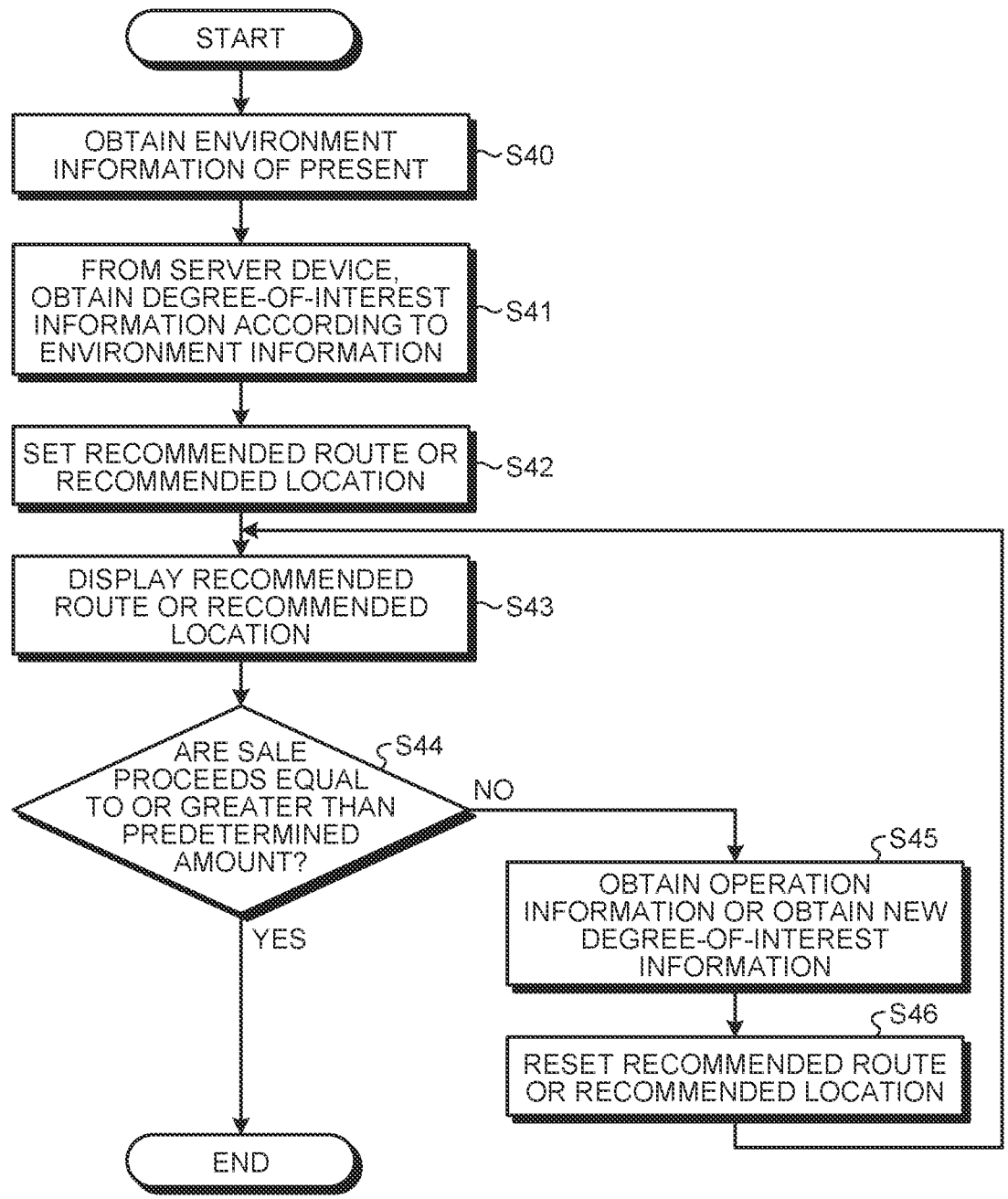
FIG. 11 is a flowchart for explaining an exemplary flow of operations performed in the information processing device according to the second embodiment.

Explained below with reference to FIG. 11 is an exemplary flow of operations performed in the information processing device according to the second embodiment. FIG. 11 is a flowchart for explaining an exemplary flow of operations performed in the information processing device according to the second embodiment.

The operations performed at Steps S40 and S41 are identical to the operations performed at Steps S30 and S31 illustrated in FIG. 9. Hence, that explanation is not given again.

The control unit 160A sets the recommended route that should be taken or sets the recommended location that should be visited (Step S42). More particularly, the route setting unit 168 sets the recommended route or the recommended location based on the degree-of-interest information obtained from the server device 20. Then, the system control proceeds to Step S43.

The control unit 160A displays the recommended route or the recommended location (Step S43). More particularly, the output control unit 169 displays, in the display unit 150, the recommended route or the recommended location along with map information. When the mobile sales vehicle is an autonomous driving vehicle, the operation at Step S43 can be omitted. When the mobile sales vehicle is a manual driving vehicle, the driver drives the mobile sales vehicle according to the recommended route or the recommended location displayed in the display unit 150.

The control unit 160A determines whether or not the sale proceeds of the products are equal to or greater than a predetermined amount (Step S44). More particularly, the sales determining unit 172 determines whether or not the sale proceeds of the products within a predetermined period of time are equal to or greater than a predetermined amount. If it is determined that the sale proceeds are equal to or greater than the predetermined amount (Yes at Step S44), then it marks the end of the operations illustrated in FIG. 11. However, if it is determined that the sale proceeds are smaller than the predetermined amount (No at Step S44), then the system control proceeds to Step S45.

When it is determined that the sale proceeds are smaller than the predetermined amount (No at Step S44), the control unit 160A obtains the operation information or obtains new degree-of-interest information (Step S45). More particularly, the route setting unit 168 obtains the operation information related to the setting operation of the route and the location of sale as input by the user from the operating unit 140. Alternatively, the different degree-of-interest information obtaining unit 170 obtains the degree-of-interest information that is different than the degree-of-interest information obtained at Step S41. Then, the system control proceeds to Step S46.

The control unit 160A resets the recommended route or the recommended location (Step S46). More particularly, the route setting unit 168 resets the recommended route or the recommended location based on the operation information or the degree-of-interest information obtained at Step S45. Then, the system control returns to Step S43.

In the second embodiment, at Step S41, the sales information obtaining unit 173 can obtain the sales information of the other mobile sales vehicles. Moreover, at Step S41, the inventory information obtaining unit 174 can obtain the inventory information of the other mobile sales vehicles. In that case, based on the sales information and the inventory information of the other mobile sales vehicles, the route setting unit 168 can set the recommended route or the recommended location.

As explained above, in the second embodiment, the information processing device 100A can set the recommended route or the recommended location for selling the products. As a result, in the second embodiment, the products can be sold in the recommended route or at the recommended location having high sales effectiveness. That enables achieving an increase in the sales of the products.

Moreover, in the second embodiment, when the mobile sales vehicle is an autonomous driving vehicle, the information processing device 100A can have the function of determining suspicious vehicles and suspicious persons based on the video taken by an in-vehicle camera. For example, the information processing device 100A determines that a person who does not move away from the mobile sales vehicle for a predetermined period of time or more without buying any product is a suspicious person. When a suspicious vehicle or a suspicious person is detected, the information processing device 100A can store, in the server device 20, information such as the image of the suspicious vehicle or the suspicious person. As a result, the information about the suspicious vehicles and the suspicious persons can be shared among a plurality of mobile sales vehicles. Moreover, the information processing device 100A can also have the function of contacting the police when a suspicious vehicle or a suspicious person is detected. As a result, in the second embodiment, it becomes possible to enhance the safety of the mobile sales vehicles.

Furthermore, in the second embodiment, the information processing device 100A can determine the condition of the other vehicles and accordingly determine and set the recommended route and the recommended location. For example, the information processing device 100A can set, in real time, the location and the route having a concentration of customers as the recommended location and the recommended route. More particularly, the information processing device 100A uses, with priority, the degree-of-interest information of the timings close to the current timing, and accordingly determine the recommended route and the recommended location. As an example of the condition of another vehicle, it is possible to think that the customers are concentrated at the other vehicle because the degree of interest with respect to the other vehicle is higher than a predetermined value, and the information processing device 100A can determine that location and that route as the recommended location and the recommended route. As another example of the condition of another vehicle, based on the sales information of the other vehicle, when the sale proceeds within a predetermined period of time are higher than a predetermined value, it is possible to think that the customers are concentrated at the other vehicle. Hence, the information processing device 100A can determine that location and that route as the recommended location and the recommended route. As still another example of the condition of another vehicle, based on the inventory information of the other vehicle, when the inventory is less than a predetermined level, it is possible to think that the customers are concentrated at the other vehicle. The information processing device 100A can determine the condition of other vehicles based on the videos taken by the in-vehicle camera. As a result, in the second embodiment, a plurality of mobile sales vehicles can be allocated to the location at which the customers are concentrated, so that the sales of the mobile sales vehicles can be mutually increased and the congestion can also be eliminated.

Third Embodiment

Given below is the explanation of a third embodiment.

In the first and second embodiments, the information processing device 100 or the information processing device 100A is installed in a vehicle running on the roads. Alternatively, the information processing device 100 or the information processing device 100A can be installed in a vehicle that runs at places other than the roads. For example, the information processing device 100A can be installed in a product sales robot that autonomously moves around a predetermined premises, such as a theme park, and sells products.

In the third embodiment, for example, the following information is stored in the information processing device 100A: map information of the premises in which the product sales robot moves around; and the degree-of-interest information related to the attribute-by-attribute degrees of interest of the persons with respect to the products at each location specified in the map information. Thus, based on the map information of the premises and the degree-of-interest information, the information processing device 100A sets the recommended location of sale at which the products should be sold. Based on the map information and the degree-of-interest information, the product sales robot moves around the premises for selling the products. The product sales robot sells the products at the recommended location of sale set by the information processing device 100A. If sale proceeds of the products within a predetermined period of time at the recommended location do no reach a predetermined amount, then the information processing device 100A again sets the recommended location. Then, the product sales robot moves to the newly-set recommended location and sells the products.

As explained above, in the third embodiment, within the specific premises such as a theme park, the information processing device 100 can set the recommended location at which the products should be sold. If the sale proceeds of the products at the recommended location do not reach a predetermined amount, then the information processing device 100A can again set the recommended location. That enables achieving an increase in the sales of the products.

Moreover, in the third embodiment, in an identical manner to the second embodiment, the information processing device 100A can set, in real time, the location and the route having a concentration of customers as the recommended location and the recommended route. More particularly, in the third embodiment, when the degree of interest with respect to another product sales robot is higher than a predetermined value, it is possible to think that the customers are concentrated at the other product sales robot. Hence, the information processing device 100A can determine that location as the recommended sales location. As an example of the condition of another product sales robot, since the sale proceeds within a predetermined period of time are higher than a predetermined value, it is possible to think that the customers are concentrated at the other product sales robot. Hence, the information processing device 100A can determine that location as the recommended sales location. As a result, in the third embodiment, a plurality of product sales robots can be placed at the location at which the customers are concentrated, so that the sales of the product sales robots can be mutually increased and the congestion can also be eliminated.

According to the application concerned, it becomes possible to set an appropriate route.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device that performs operations comprising:
    obtaining a video of outside of a vehicle as taken by a camera installed in the vehicle;
    obtaining position information of the vehicle;
    detecting a person based on a face image included in the video;
    determining direction of eye gaze of the person;
    based on the direction of eye gaze, determining a degree of vehicle interest with respect to the vehicle;
    setting a route to be taken by associating the position information and the degree of vehicle interest;
    obtaining environment information; and
    storing degree-of-interest information comprising associating the degree-of-interest information with the environment information,
    wherein the route to be taken is based on the environment information and based on the degree-of-interest information, and
    wherein the route comprises locations at which there is a high degree of interest that corresponds to the environment information and to the degree-of-interest information.

2. The information processing device according to claim 1, wherein the operations further comprise:
    obtaining degree-of-interest information determined in another vehicle.

3. The information processing device according to claim 2, wherein the operations further comprise:
    setting another route to be taken based on the degree-of-interest information that is determined in the other vehicle.

4. An information processing system, comprising: the information processing device according to claim 1; and a server device that obtains vehicle information from the information processing device.

5. The information processing device according to claim 1, wherein the operations further comprise:
    determining an attribute of the person; and
    determining the degree of vehicle interest based on the direction of eye gaze and based on the attribute.

6. The information processing device according to claim 1, wherein the environment information comprises date, time and weather information.

7. The information processing device that performs operations comprising:
    obtaining a video of outside of a vehicle as taken by a camera installed in the vehicle;
    obtaining position information of the vehicle;
    detecting a person based on a face image included in the video;
    determining direction of eye gaze of the person;
    based on the direction of eye gaze, determining a degree of vehicle interest with respect to the vehicle; and
    setting a route to be taken by associating the position information and the degree of vehicle interest,
    wherein the vehicle is a mobile sales vehicle that moves around for selling a product;
    determining whether or not sale proceeds of the product have reached a predetermined amount; and
    if the determining results in a determination that the sale proceeds of the product have not reached the predetermined amount setting the route to be taken based on the degree-of-interest information determined in another vehicle, the route comprising locations at which there is a high degree of interest that corresponds to the degree-of-interest information.

8. The information processing device according to claim 7, wherein the operations further comprise:
    obtaining sales information related to sale proceeds of the product in another mobile sales vehicle,
    setting the route to be taken based on the sales information of the other mobile sales vehicle.

9. The information processing device according to claim 7, wherein the operations further comprise:
    obtaining inventory information of the product in another mobile sales vehicle; and
    setting the route to be taken based on the inventory information of the other mobile sales vehicle.

10. The information processing device according to claim 7, wherein the environment information comprises date, time and weather information.

11. An information processing methods comprising:
    obtaining a video of outside of a vehicle as taken by a camera installed in the vehicle;
    obtaining position information of the vehicle;
    detecting a person based on a face image included in the obtained video;
    determining direction of eye gaze of the detected person;
    determining, based on the determined direction of eye gaze, degree of vehicle interest with respect to the vehicle;
    setting a route to be taken by associating the position information and the degree of vehicle interest,
    obtaining environment information;
    storing, in a memory, degree-of-interest information comprising associating the degree-of-interest information with the environment information; and
    setting the route to be taken based on the environment information and based on the environment information and based on the degree-of-interest information, the route comprising locations at which there is a high degree of interest that corresponds to the environment information and to the degree-of-interest information.

12. The information processing method according to claim 11, wherein the environment information comprises date, time and weather information.

* * * * *